United States Patent [19]

Kohari et al.

[11] Patent Number: 5,083,066

[45] Date of Patent: Jan. 21, 1992

[54] METHOD OF CONTROLLING SYNCHRONOUS OPERATION OF MACHINE TOOL

[75] Inventors: Katsuo Kohari, Tachikawa; Shinichi Kono; Masaaki Fukukura, both of Oshino, all of Japan

[73] Assignee: Fanuc Ltd., Minamitsuru, Japan

[21] Appl. No.: 460,105

[22] PCT Filed: Jul. 28, 1989

[86] PCT No.: PCT/JP89/00779

§ 371 Date: Feb. 9, 1990

§ 102(e) Date: Feb. 9, 1990

[87] PCT Pub. No.: WO90/01829

PCT Pub. Date: Feb. 22, 1990

[30] Foreign Application Priority Data

Aug. 2, 1988 [JP] Japan .................. 63-193146

[51] Int. Cl.⁵ ........................................... H02P 5/52
[52] U.S. Cl. ........................................... 318/41; 318/59; 318/77
[58] Field of Search .................. 318/41, 45, 53, 59, 318/66, 68, 69, 70, 71, 72, 77, 560, 569, 600

[56] References Cited

U.S. PATENT DOCUMENTS

| | | | |
|---|---|---|---|
| 4,260,936 | 4/1981 | Sun | 318/66 |
| 4,347,471 | 8/1982 | Kohzai et al. | 318/616 |
| 4,501,999 | 2/1985 | Kohzai et al. | 318/632 |
| 4,862,380 | 8/1989 | Kawamura et al. | 364/474.11 |
| 4,979,121 | 12/1990 | Inoue et al. | 364/474.36 |
| 4,985,841 | 1/1991 | Iwagaya | 364/474.33 |

*Primary Examiner*—Bentsu Ro
*Attorney, Agent, or Firm*—Staas & Halsey

[57] ABSTRACT

In a machine tool having first and second spindles, which are connected to respective spindle motors and control circuits each control circuit including a velocity controller and a position controller, and which simultaneously grasp the same workpiece, in which state the workpiece is subjected to machining. At such time, a digital velocity command provided by, e.g., a numerical control unit, is supplied to the two spindles simultaneously, switches for isolating the position controller from the velocity controller at each spindle is controlled at the respective spindle, a synchronous operation mode, which changes over the velocity command to a position command, is established, and the digital velocity command value is processed as a position command, whereby the two spindles are subjected to identical positional control. As a result, the rpm's of the spindles are synchronized and the workpiece can be machined and separated into two parts without subjecting it to excessive force.

3 Claims, 2 Drawing Sheets

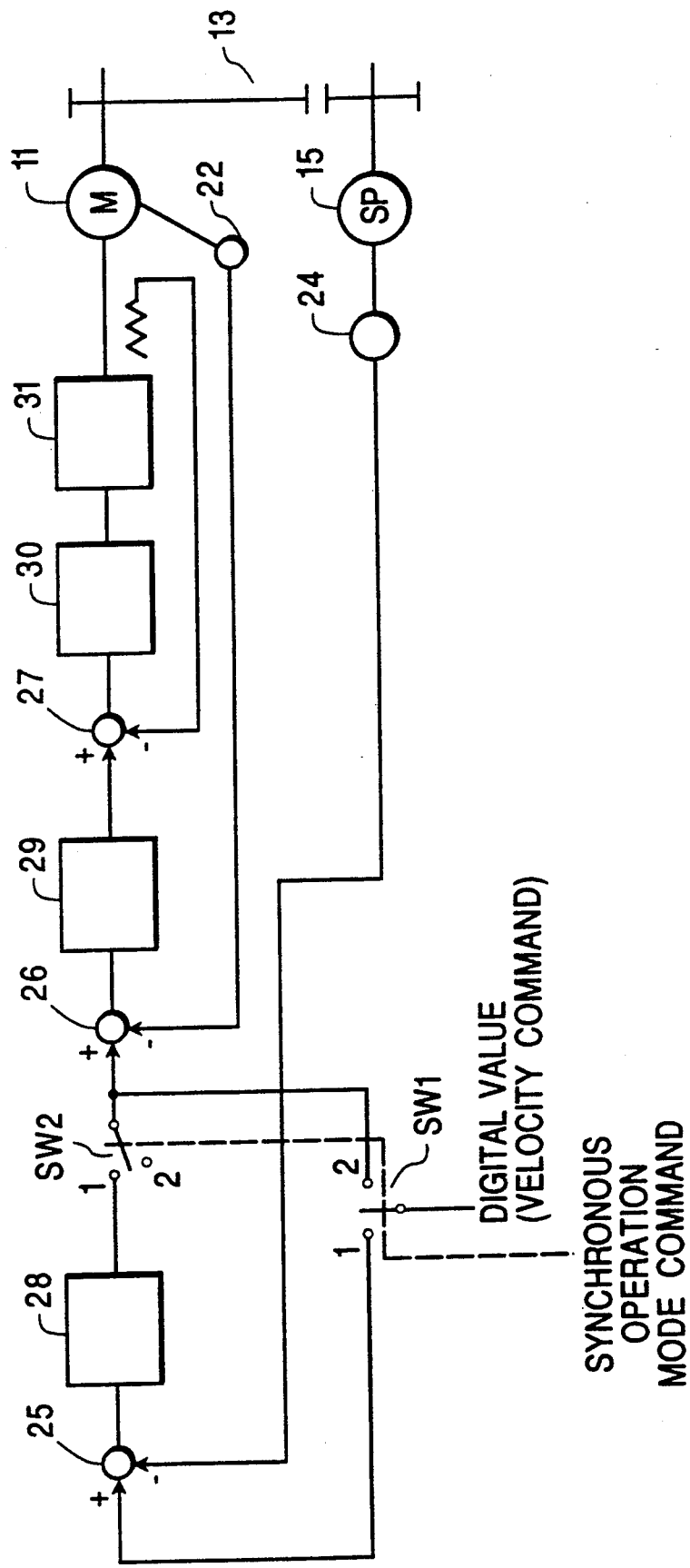

METHOD OF CONTROLLING SYNCHRONOUS OPERATION OF MACHINE TOOL

BACKGROUND OF THE INVENTION

This invention relates to an apparatus for controlling the synchronous operation of the spindles of a machine tool having two spindles. More particularly, the invention relates to a method of controlling the synchronous operation of the machine tool, which method is so adapted that the rotational speeds of the two spindles are made to coincide with excellent precision.

Machine tools having multiple spindle head units are widely employed as means for realizing shorter piece time when machining workpieces. Such machine tools are provided with two or more spindles for each tool rest, as seen, for example, in NC lathes, and the spindles are controlled by respective independent spindle motors to shorten the time needed to mount and dismount workpieces. Alternatively, the versatility with which workpieces can be machined is raised by employing spindle motors having different capabilities.

When the grip upon a workpiece is changed among a plurality of spindles, the same velocity command is applied to the spindle motors and, at the moment the velocities coincide, a transition is made to the next machining operation without stopping the rotating workpiece.

In such a conventional machine tool in which two spindles are arranged in opposition on the same axis and the tool rests are capable of performing machining on the workpiece irrespective of which spindle it is mounted on, it is necessary that the two spindle velocities coincide reliably when the workpiece is released by one spindle and grasped by the other. If this is not accomplished, there is the danger that the workpiece will be damaged or deformed by a chuck. If the spindle motors differ, however, it is difficult to bring the two rotational velocities into perfect agreement. In addition, rotational velocities fluctuate depending upon the load, even if the velocity commands are the same.

Accordingly, the present inventors have already filed an application (Japanese Patent Application No. 63-55765) for an invention in which a velocity error signal between the velocities of first and second spindles of a machine tool having these two spindles is added to a velocity command of the second spindle to correct the velocity command of the second spindle.

Synchronous operation in such case is achieved by applying the same velocity command to the spindles and limiting the torque of one of the spindles With this method, however, an offset develops between the two spindles if the velocity command is an analog signal, and there is the danger that the rpm's of the two spindles will shift away from each other, even if synchronism is temporarily achieved, owing to an error in a velocity feedback signal Consequently, when cutting is performed in a state where the same workpiece is grasped simultaneously by first and second spindles and the workpiece is separated into two portions by this machining, it is necessary to raise the precision of the synchronous operation and maintain the synchronized state. In other words, if an offset in synchronism develops, an excessive force acts upon the workpiece, thus making it impossible to perform highly precise machining.

SUMMARY OF THE INVENTION

The present invention has been devised in order to solve the foregoing problems and its object is to provide a novel synchronous operation control method in which a velocity command is applied by an NC unit as a digital signal so that an offset between the rpm's of spindles can be eliminated. Further, an object of the invention is to provide an apparatus for controlling synchronous operation of spindles in which, in order to control the synchronous operation of spindles of a machine tool having two spindles, control is performed in such a manner that the positions of the two spindles become the same.

In accordance with the present invention, there can be provided a method of controlling synchronous operation of a machine tool having first and second spindles, the rotational velocities whereof are controlled by a velocity command which is a digital value, including the steps of supplying a synchronous operation mode command when a workpiece subjected to cutting machining is grasped simultaneously by the first and second spindles, inputting a velocity command to a control circuit of each spindle as a spindle position command signal in a mode set by the synchronous operation mode command, and performing positional control by the control circuit of each spindle based on the position command signal, thereby synchronously rotating the two spindles.

Further, in a machine tool having two spindle motors, each controlled by a control circuit which includes a velocity controller and a position controller, wherein first and second spindles are driven independently by respective spindle motors, an apparatus for controlling synchronous operation of the two spindles including signal input means for selecting each spindle position command signal and velocity command signal and supplying these signals to the respective control circuit, isolating means for isolating the position controller of each control circuit from the velocity controller of the control circuit, and synchronous operation mode setting means for controlling the isolating means and changing over the velocity command to the position command.

The spindle synchronous operation control apparatus of the present invention is such that the velocity command for the two spindles is given by a common digital value When the synchronous operation control mode has been set, this digital value is processed as a position command in each control circuit. When control is performed for synchronous operation, therefore, the positions of the two spindles are controlled so as to be the same and an offset in synchronism can be eliminated.

BRIEF DESCRIPTION OF THE DRAWINGS

FIG. 2 is a control block diagram showing an example of an apparatus for controlling the synchronous operation of spindles according to the present invention.

DESCRIPTION OF THE PREFERRED EMBODIMENTS

Figure 1:
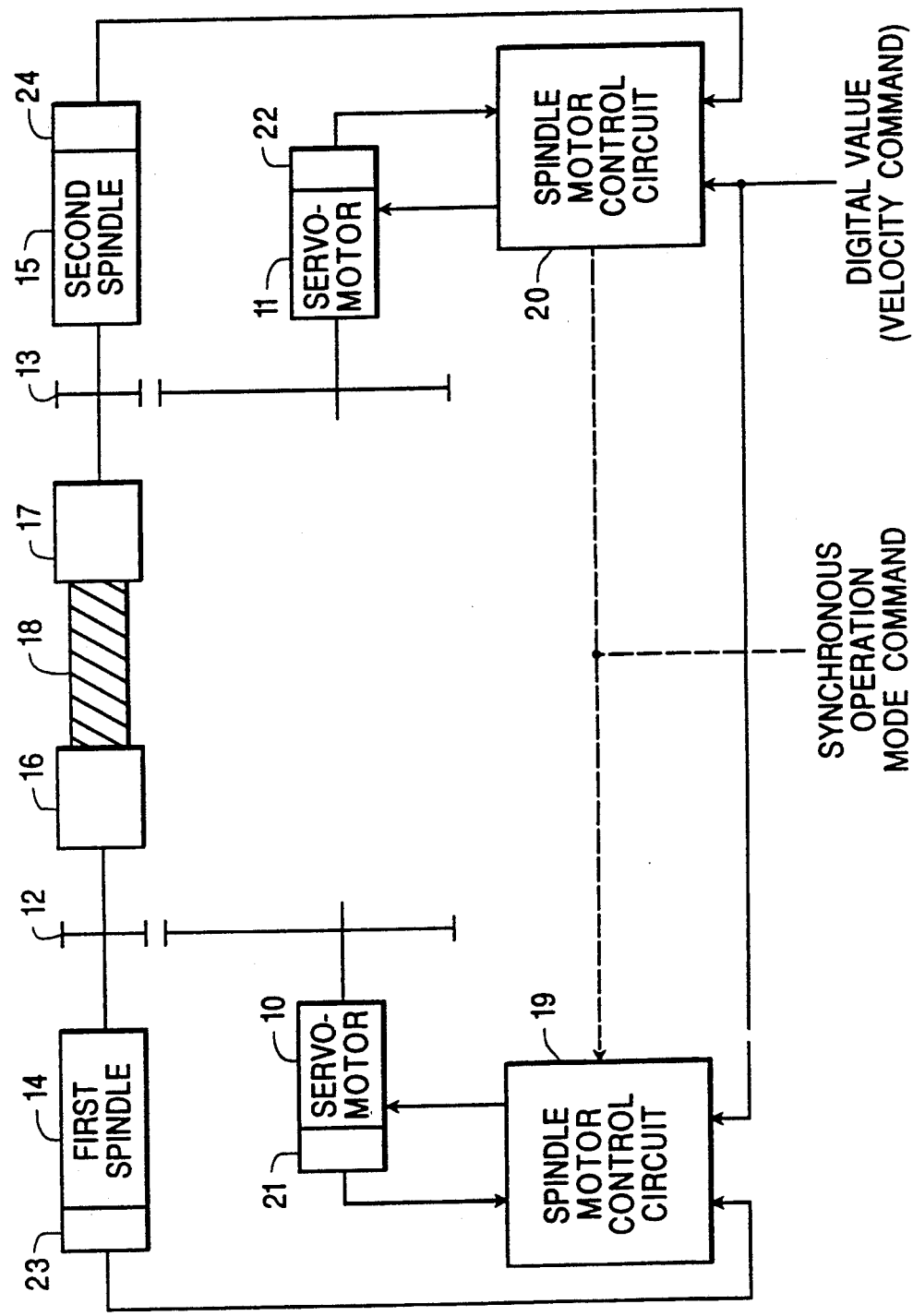
FIG. 1 is a schematic view showing an example of a machine tool to which the method of the present invention can be applied and is for describing the mechanism thereof.

An embodiment of the present invention will now be described in detail with reference to the drawings.

FIG. 1 is a schematic view showing an example of a machine tool to which the method of the present invention can be applied and is for describing the mechanism thereof. Here two spindle servomotors 10, 11 controlled for synchronous operation rotate a first spindle 14 and a second spindle 15 via gear mechanisms 12, 13, respectively. The arrangement is assumed to be that of a machine tool such as a lathe, by way of example.

A chuck 16 attached to the first spindle 14 and a chuck 17 on the side of the second spindle 15 grasp the same workpiece 18, and it is in this state that cutting is carried out. The two spindles 14, 15 are rotated synchronously for a certain period of time and the workpiece 18 is cut through completely to form two parts, after which the spindles are controlled independently, in accordance with ordinary velocity control, by a velocity command supplied to spindle motor control circuits 19, 20 for the respective spindles.

To achieve this, the spindle motors 10, 11 are provided with respective velocity detectors 21, 22, and velocity signals from these velocity detectors 21, 22 are fed back to the respective spindle motor control circuits 19, 20. Furthermore, the control circuits 19, 20 of the first spindle 14 and second spindle 15 are supplied with position feedback signals from respective position detectors 23, 24, and a changeover is made to position control in response to a synchronous operation mode command.

By setting this spindle synchronous operation mode, a commanded velocity applied to the control circuits 19, 20 in the form of a digital value is processed as a position command so that positional control of the spindles 14, 15 can be performed based on the position feedback signals from the position detectors 23, 24. As a result, the precision of the synchronous operation is improved, the synchronized state is maintained and the load on the workpiece 18 is reduced.

FIG. 2 is a control block diagram showing an example of an apparatus for controlling the synchronous operation f spindles according to the present invention. The above-mentioned spindle motors 10, 11 are subjected to similar control.

Control will be described with regard to spindle motor 11 as an example. The spindle motor 11 is for rotating the second spindle 15 via the gear mechanism 13. The position feedback signal from the position detector 24 provided on the second spindle 15 enters a subtractor 25. The velocity feedback signal from the velocity detector 22 of the spindle motor 11 enters a subtractor 26, and a current feedback signal detected from a power line of the spindle motor 11 enters a subtractor 27.

The subtractor 25 is supplied with a velocity command from an NC via a switch SW1. The velocity command is in the form of a digital value and serves as a position command for the spindle motor 11. The output of the subtractor 25 is supplied to a position control circuit 28 as a position error, and the output of the position control circuit 28 is supplied, via a switch SW2, to the subtractor 26 as a velocity command. In the absence of the synchronous operation mode command, the subtractor 26 is supplied, via the switch SW1, with the aforementioned digital value serving as a velocity command. By setting the switch SW2 to the open state at such time, the position controller of the control circuit is isolated from the velocity controller.

More specifically, by supplying the same digital value to the control circuits 19, 20 when the synchronous operation mode is commanded, the velocity error formed by the subtractor 26 causes the two spindles 14, 15 to be controlled for synchronous operation with the output of the position control circuit 28 serving as a reference at the time of synchronous operation. In a case where the velocities of the spindles are controlled independently, it will suffice to change over the switches SW1, SW2 so that the digital value will serve as a velocity command. The velocity error is applied to a velocity control circuit 29, where the error signal is subjected to proportional integration processing and then supplied to the subtractor 27 as a torque command. On the basis of an error signal from the subtractor 27, which expresses the error between the torque command and the current feedback signal, the spindle motor 11 is operated by a current control circuit 30 and a power amplifier circuit 31.

Thus, the two switches SW1, SW2 are each changed over to the contact 1 side if the synchronous operation mode command is on. At the time of ordinary independent operation, the above-mentioned mode command is turned off, in which case each switch is changed over to the contact 2 side. In other words, when the synchronous operation mode command is issued, switch SW2 is closed and the velocity command for the control circuits 19, 20 of both spindles 14, 15 enters as the spindle position command signal via the switch SW1, whereby positional control is carried out.

Thus, if the synchronous operation mode command is supplied when the workpiece undergoing cutting is grasped simultaneously by the chucks 16, 17 of the first and second spindles, velocity control is carried out based on the positions of the spindles in accordance with the feedback signals from the position detectors 23, 24. As a result, even if the characteristics of the two spindle motors 10, 11 differ or there is a difference in the gear ratio between the two spindles, the spindles can be rotated synchronously in reliable fashion and the workpiece will not be subjected to excessive force.

The apparatus for controlling the synchronous operation of spindles according to the present invention is such that an offset between the rpm's of the two spindles can be eliminated reliably by detecting the positions of the spindles. Moreover, a velocity command can be changed over to a position command by applying a synchronous operation mode command. Synchronization can readily be achieved even in a case where the two spindles are operated at different gear ratios.

Though an embodiment of the present invention has been described, the invention is not limited to this embodiment but can be modified in various ways without departing from the scope of the claims.

We claim:

1. A method of controlling synchronous operation of a machine tool having first and second independently driven spindles arranged in opposition on the same axis for holding a single workpiece, the rotational velocities whereof are controlled by a velocity command, comprising the steps of:

detecting the respective positions of the spindles using position sensors, when it is desired to transfer a workpiece from the first spindle to the second spindle.

supplying a feedback signal for each spindle to a respective spindle motor control circuit;

supplying a synchronous operation mode command, when a workpiece is grasped simultaneously by said first and second spindles;

inputting a digital velocity command to the control circuit of each spindle, as a spindle position command signal in a mode set by said synchronous operation mode command; and performing positional control by the control circuit of each spindle based on the position command signal in accordance with the feedback signal from each position sensor, thereby synchronously rotating the two spindles.

2. In a machine tool having two spindle motors, each controlled by a control circuit which includes a velocity controller and a position controller, wherein first and second spindles are axially oriented in opposition and are driven independently by the respective spindle motors, an apparatus for controlling synchronous operation of the two spindles, comprising:

means for detecting the respective positions of the spindle, when it is desired to transfer a workpiece from the first spindle to the second spindle;

means for supplying a position feedback signal for each spindle to a respective spindle motor control circuit;

signal input switch means for selecting each spindle position command signal and velocity command signal and supplying these signals to the respective control circuit;

isolating switch means for isolating the position controller of each control circuit from the velocity controller of the same control circuit; and synchronous operation mode setting means for controlling the isolating switch means and changing over the velocity command to the position command wherein, when synchronous operation of the spindles is desired, the signal input switch means and the isolating switch means are each moved to a first contact side so that the velocity command enters the control circuits as the spindle position command signal, and, when non-synchronous operation of the spindles is desired, the signal input switch means and the isolating switch means are each moved to a second contact side so that the velocity command enters the control circuits.

3. The machine tool according to claim 2, wherein said velocity command signal is inputted as a digital value.

* * * * *